Jan. 20, 1931.  F. D. POWELL  1,789,838
STAND FOR VISIBLE INDEX AND RECORD EQUIPMENT
Filed Oct. 17, 1929  2 Sheets-Sheet 1
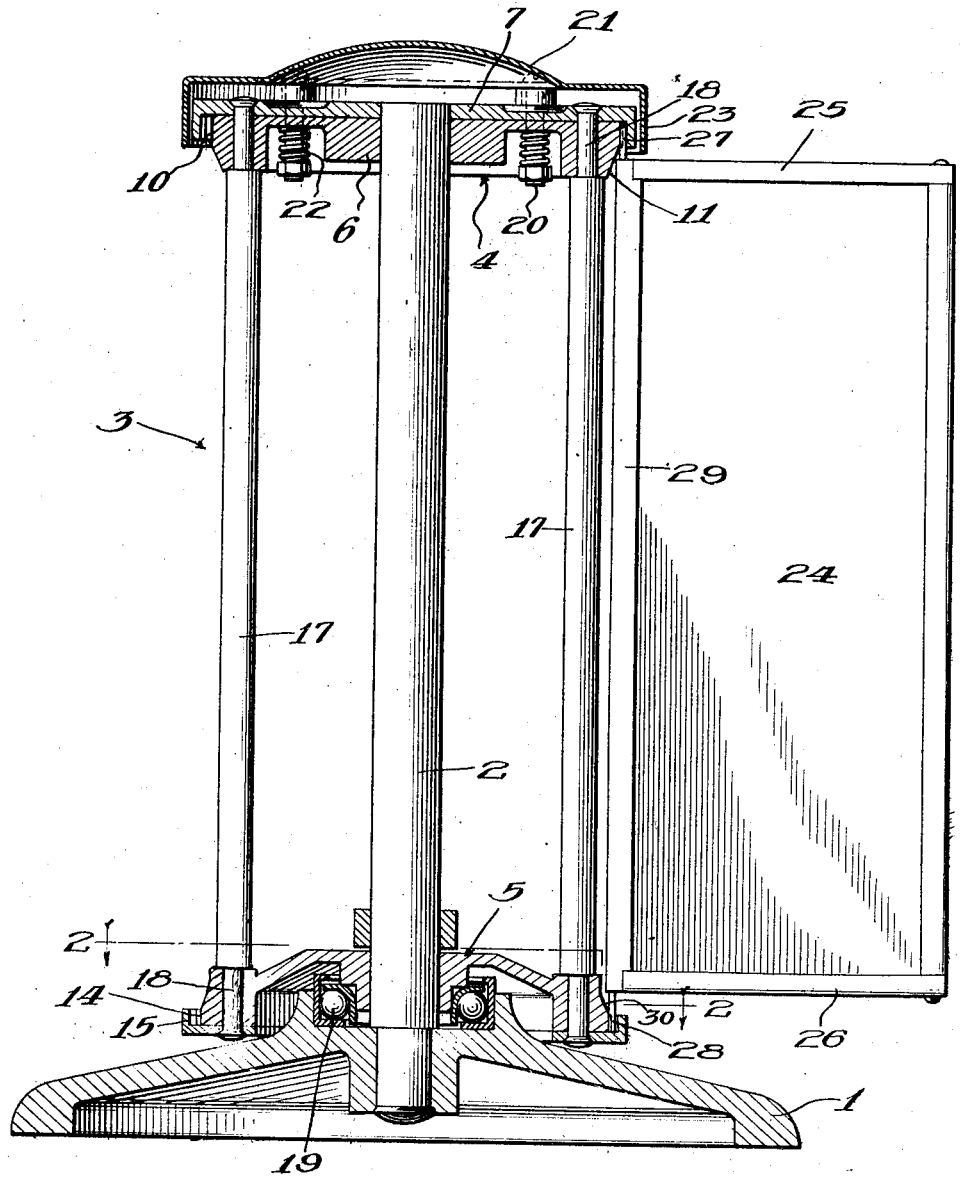
Inventor:
Frank D. Powell,
By Frank L. Belknap
Atty.

Jan. 20, 1931.　　　F. D. POWELL　　　1,789,838
STAND FOR VISIBLE INDEX AND RECORD EQUIPMENT
Filed Oct. 17, 1929　　2 Sheets-Sheet 2
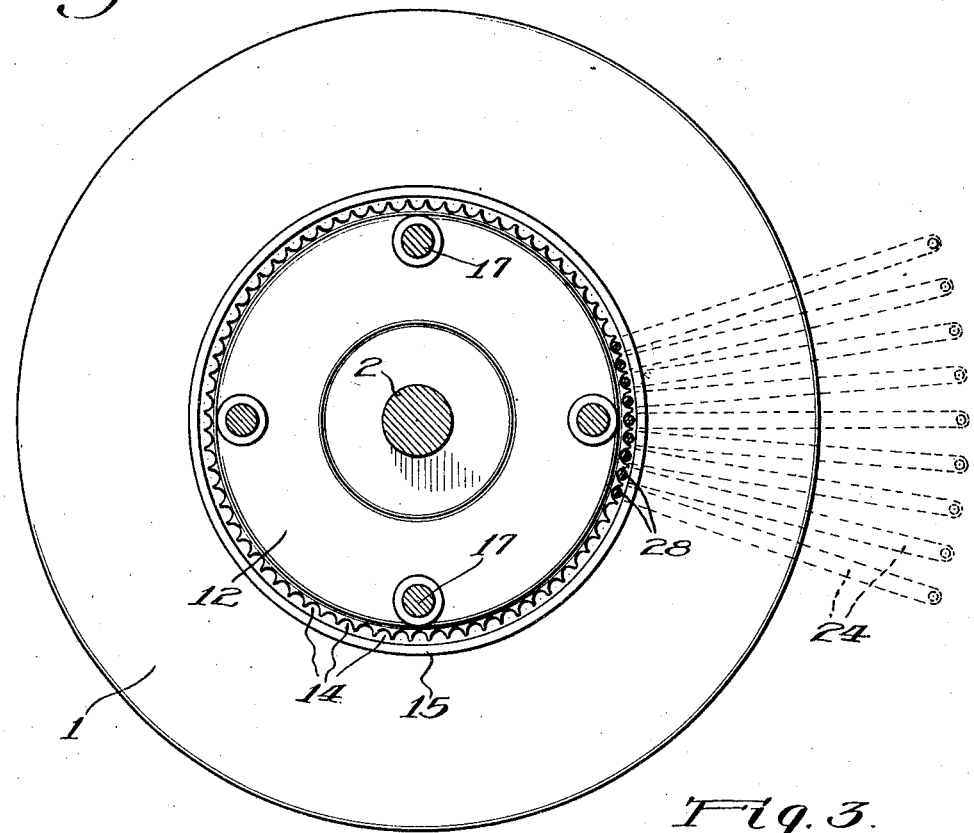
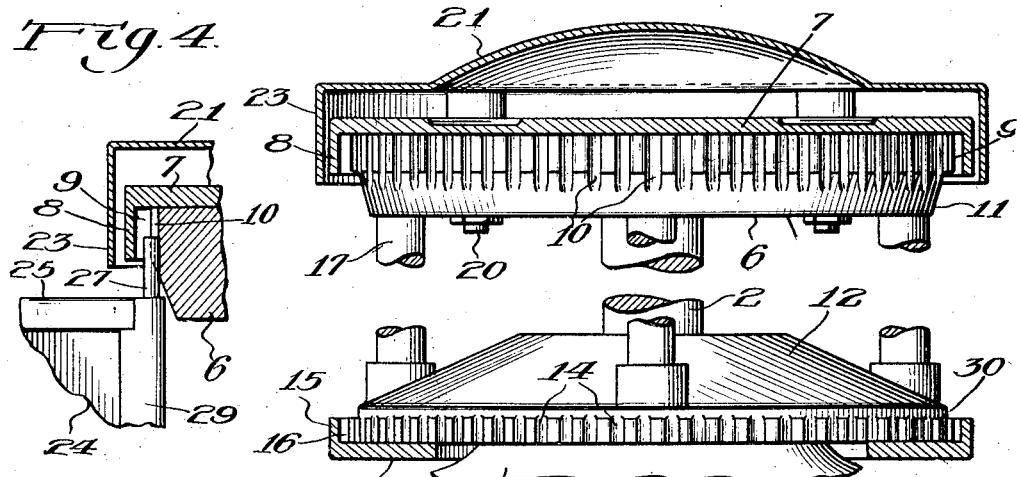
Inventor:
Frank D. Powell,
By Frank L. Bishop
Atty.

Patented Jan. 20, 1931

1,789,838

UNITED STATES PATENT OFFICE

FRANK D. POWELL, OF CHICAGO, ILLINOIS, ASSIGNOR TO ACME CARD SYSTEM COMPANY, OF CHICAGO, ILLINOIS, A CORPORATION OF ILLINOIS

STAND FOR VISIBLE INDEX AND RECORD EQUIPMENT

Application filed October 17, 1929. Serial No. 400,227.

This invention relates to improvements in a stand on which are adapted to be mounted a plurality of frames, each containing visible index or record data, and in one specific embodiment comprises a revolving or rotary stand on which is detachably mounted a large number of frames each containing a plurality of index strips, record cards, or other data readily visible to the eye.

One of the objects of the present invention is to provide a stand adapted to support a plurality of index frames and characterized by the facility with which the frames may be mounted upon, and removed from, the stand.

Various arrangements have been proposed in stands of this general character, but in most cases the devices heretofore produced are open to numerous objections, and the improvements incorporated in the present invention have been designed to overcome these particular objectionable features.

Chief among the disadvantageous features presented in the devices of the prior art, is the inability of this character to maintain the frames mounted upon the stands in a uniformly spaced relation with respect to one another, resulting in crowding of the frames at one portion of the stand, while more than ample room exists at another portion of the stand. This crowded condition of the frames renders it difficult for the operator or the one seeking the information contained upon the frames to properly view the informatory matter, inasmuch, as the arc through which the frames may rotate is considerably diminished. Due to the operator's inability to properly view the index matter, the natural tendency is to attempt to increase by force the angular position occupied by the frames in question, resulting in bending the frames, bending and ultimately breaking the pintles upon which the frames rotate, and the breaking of the dividing pins disposed in the slot in which the pintles are positioned.

To obviate this disadvantageous feature, I provide a pair of spaced annular grooves (when a rotatable stand is to be utilized), or a pair of non-annular spaced grooves (where a longitudinal stand is desired), one or both peripheral edges of each of the grooves being corrugated or scalloped, and one pintle of each frame being adapted to be retained and journaled in the indentation of the scalloped or corrugated edge. In this manner each frame is positioned a uniformly fixed distance from its neighboring frame, thereby eliminating any possibility of crowding of the frames with accompanying destructive consequences.

Another disadvantageous feature inherent in the stands of the prior art resides in their inability to support the index frames in a vertical position when less than the full complement of frames is mounted on the stand.

One of the salient features of my invention is directed toward correcting this defect and comprises means for supporting each frame individually and independently of its neighboring frames.

Briefly referred to, my invention comprises, when a rotatable stand is desired, a base of comparatively heavy material, a vertically disposed shaft, and a pair or series of pairs of spaced plates mounted upon said shaft, one being superposed above the other in tiers. Each of said plates may be constructed in several parts, consisting of a central portion and an outer flanged portion, the two parts being adapted to be secured to each other in such a manner as to provide an annular groove between the flange of the outer portion and the central portion.

As a feature of my invention, a plurality of corrugations or scallops may be formed upon the outer periphery of the central portion, that is, the edge of the central portion facing the flange, the index frame pintles being adapted to be journaled in said corrugations, thereby supporting the index frame in a vertical position between the two plates.

Although in a preferred embodiment, my invention may assume the form of a rotatable stand having one or more tiers of rotatable index units, it is to be understood that it is not intended to limit the scope of the invention thereto, since any form of index stand, rotatable, stationary, circular or straight is intended to be within the purview of the invention.

Various other objects, features and advantages will be hereinafter particularly brought out.

In the drawings:

Fig. 1 is a sectional elevation of a revolving type of stand equipped with the improvement of the present invention.

Fig. 2 is a sectional view taken on the line 2—2 of Fig. 1 and looking in the direction indicated by the arrows.

Fig. 3 is a detail view partly in section and partly in elevation, illustrating particularly the upper and lower plates.

Fig. 4 is a detail sectional view, showing a frame pintle engaged in a scalloped groove.

Referring more in detail to the drawings, 1 indicates generally a base or spreading support from the center of which projects upwardly a shaft 2 adapted to support a stand designated as a whole at 3. Although but one tier is shown in the drawings, it is to be understood that a plurality of such tiers may be mounted on the same shaft, if desired, one above the other.

In the drawings, the stand is illustrated as being of the revolving type. It is to be understood, of course, that the improvement which forms the basis of the present invention is equally applicable to non-revolving stands.

The stand 3 may comprise upper and lower plates 4 and 5 respectively. The upper plate 4 may comprise an inner annular member 6 to which may be suitably attached by screws, bolts or the like, (not shown) a flanged outer member 7, the flange 8 of which is adapted to extend downwardly around the edge of the member 6. An annular groove 9 is thus provided between the members 6 and 7. The edge of the member 6 which forms the inner wall of the groove 9 may be corrugated or scalloped, as shown best at 10 in Fig. 3. In a preferable embodiment of my invention the scallops 10 may be machined or milled or if desired, may be cast. The lower portion of the inner member 6 may be beveled, as shown at 11 in Fig. 3.

The lower composite plate 5 may be built up of an inner annular element 12 and a flanged outer element 13 being attached to each other in an obvious manner. The outer edge of the inner element may be scalloped as shown at 14, similar to the scallops in the edge of the member 6. The outer element 13 is provided with an annular flange 15 which may be extended upwardly around the scalloped edge of the element 12 providing an annular groove 16 therebetween.

A plurality of rods 17 connect the upper plate 4 to the lower plate 5 by means of screws or the like 18 thereby forming a unitary revolving structure in which the two plates are spaced the desired distance from each other. To facilitate rotation of the structure a ball bearing assembly 19 may be provided.

A plurality of apertures may be provided in the upper plate 4 into which may be inserted elongated pins or bolts 20. A movable disc 21 is illustrated as being supported on the upper portion of the upper plate 4, provided adjacent its outer edge with apertures into which are adapted to be inserted the pins 20 which latter, having enlarged heads, rest upon the upper surface of the movable disc 21.

The arrangement is such that the pins 14 pass through the movable disc and through the plates 4 projecting below the latter a considerable distance. Each of the pins on its lower end may be provided with an adjustable nut which functions to hold a coil spring 22 against the lower side of the plate 4.

The outer edge 23 of the disc 21 may project beyond the outer edge of the flange 8 of the upper plate 4 for a purpose to be hereinafter described.

In the utilization of the invention, an index frame 24 having an upper edge 25, a lower edge 26, an upper pintle 27 and a lower pintle 28 is adapted to be mounted on the stand. The pintles 27 and 28 may be inserted into the upper and lower grooves or slots 9 and 16 respectively, and as is obvious are journaled in the scallops 10 and 14. Assume that it is desired to mount frame 24 on the stand. The upper pintle 27 is inserted in the groove 9 below the overhanging edge 23 of the disc 21. Referring particularly to Fig. 3, it can be readily seen that the lower ends of the indentations 10 extend below the edge 23 and thereby serve as a guide to the operator in inserting the upper pintle 27 into the slot 9. Pressure is applied to the frame, for instance, by hand, to force the pintle 27 upwardly to the point where the top edge of said pintle abuts against the top wall of the groove 9. During this upward movement of the pintle, the upper edge 25 of the frame has made contact with the overhanging edge 23 of the top of the disc 21, thus raising that side of the cover disc from its normal position, the disc carrying with it the pin 20 and compressing the spring 22 against the lower surface of the plate 4. When the pintle 27 has made contact with the closed upper wall of the groove 9, the lower edge of the lower pintle 28 will have room enough to clear the upper edge of the flange 15 defining the groove 16, thus permitting said lower pintle 28 to be inserted in the groove 16 and into one of the scallops 14.

The frame is then moved or permitted to move downwardly until the lower edge of the lower pintle 28 rests in the lower portion of the lower groove 16, whereupon the disc 21, under the influence of the spring 22, will also be restored to normal position. The frame at this point will occupy the position illustrated very clearly in Fig. 1.

To provide clearance for the edge 29 of the frame 24, thereby shortening the unsupported length of the pintles 27 and 28 and hence strengthening the frame structure and make the same more compact, the inner annular members 6 and 12 may be beveled, as shown at 11 and 30 respectively.

Referring particularly to Fig. 2, it can be readily seen that the indentations 14 are defined in section, by a curve of greater radius than the radius of the pintles adapted to be disposed therein. This feature is provided to afford the pintles a slight degree of freedom of lateral motion within the said indentations and as can be observed permits a wider swing of the frames 24 when it is desired to view the informatory matter thereon. Also, the flange 8 is disposed a sufficient distance from the corrugated edge to permit a slight degree of freedom for the pintles in a radial direction. The same construction, of course, is also existent relative to the lower plate 12.

Modifications of the structure as described may be made; for instance, instead of machining the scallops 10 and 14, the plates 4 and 5 may be constructed of one piece of material and a series of apertures may be bored in the plates into which the pintles may be journaled. It is understood that other modifications of my invention may be made without departing from the spirit of the invention, and hence I do not wish to be limited except as is necessitated by the prior art.

I claim as my invention:

1. In combination, a supporting device for index leaves or the like, comprising spaced upper and lower plates having annular grooves, a plurality of index leaves detachably engaged thereby, means for uniformly spacing said index leaves from one another comprising scallops formed in the walls of the said grooves, and downwardly acting vertical movable means to prevent the accidental disengagement of the leaves from said grooves.

2. In an index stand for removably supporting a plurality of index frames, spaced upper and lower plates provided with inwardly facing opposed grooves, one edge of each of the grooves being scalloped, each index frame being provided with a pintle adapted to be journaled in the scallops formed in the groove walls, the weight of each index frame being sustained by the pintle.

3. In combination, a stand for removably supporting a plurality of index frames, including spaced upper and lower plates, each plate comprising an inner annular member having a scalloped periphery and a flanged outer member, said flange being disposed adjacent the scalloped periphery forming a groove therebetween in which pintles of the said index frames are adapted to be journaled, said lower scalloped member and said lower flange serving as a thrust bearing for the pintles.

4. In combination, a supporting device for index leaves or the like comprising spaced upper and lower plates having annular grooves, a plurality of index leaves detachably engaged thereby, means for uniformly spacing said index leaves from one another comprising a plurality of defined compartments in said grooves, and downwardly acting movable means to prevent the accidental disengagement of the leaves from said grooves.

In testimony whereof I affix my signature.

FRANK D. POWELL.